A. Y. DAVIS.
VEHICLE WHEEL.
APPLICATION FILED OCT. 31, 1910.
1,014,694.
Patented Jan. 16, 1912.
2 SHEETS—SHEET 2.
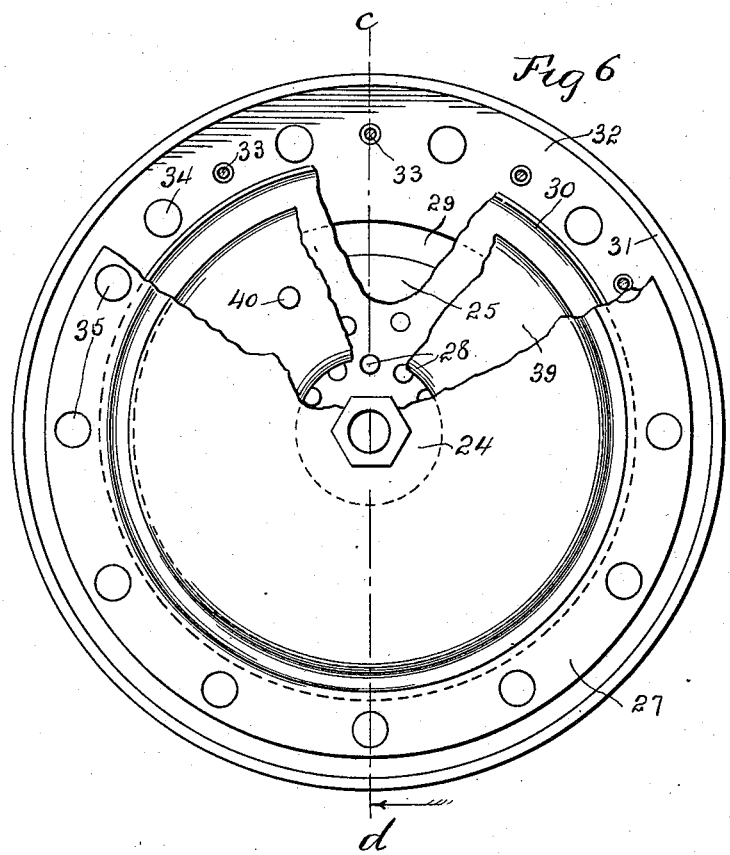
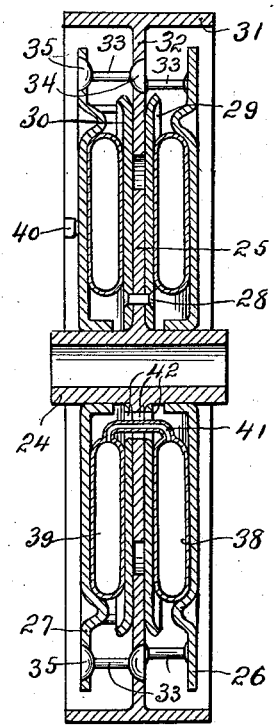
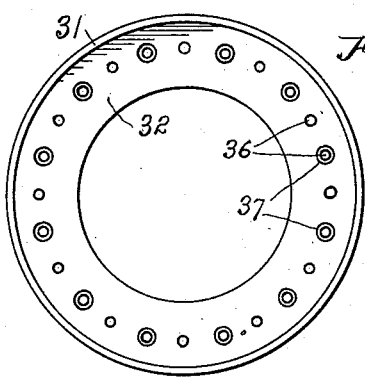
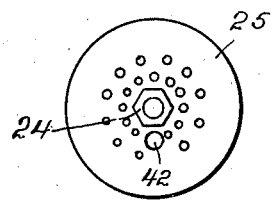
WITNESSES:
R. E. Hamilton
E. B. House
INVENTOR.
Alpha Y. Davis
BY Warren D. House
His ATTORNEY.

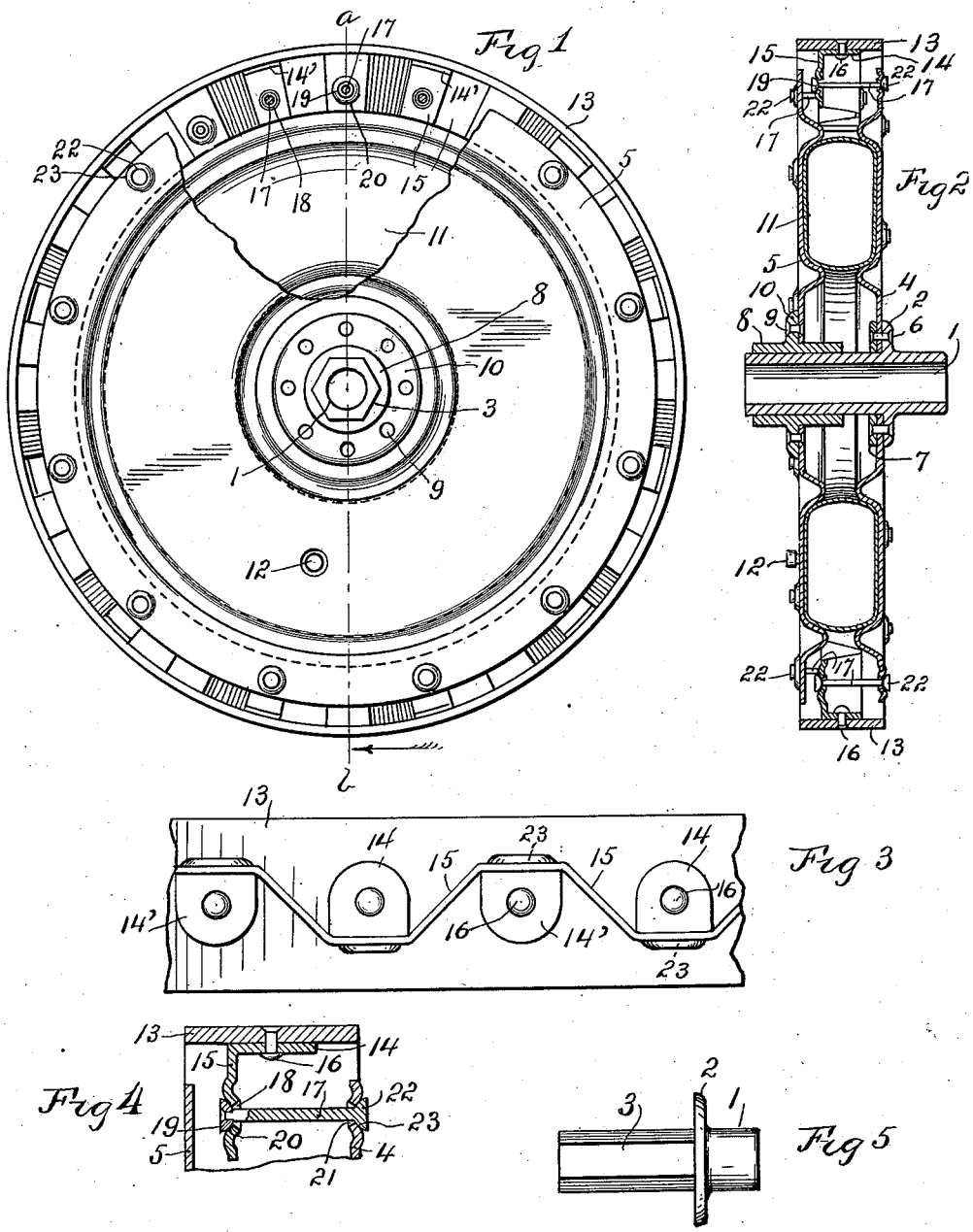

UNITED STATES PATENT OFFICE.

ALPHA Y. DAVIS, OF KANSAS CITY, MISSOURI.

VEHICLE-WHEEL.

1,014,694.  Specification of Letters Patent.  Patented Jan. 16, 1912.

Application filed October 31, 1910. Serial No. 589,983.

*To all whom it may concern:*

Be it known that I, ALPHA Y. DAVIS, a citizen of the United States, residing at Kansas City, in the county of Jackson and State of Missouri, have invented certain new and useful Improvements in Vehicle-Wheels, of which the following is a specification.

My invention relates to improvements in vehicle wheels.

The object of my invention is to provide a vehicle wheel which is strong and durable and which possesses all the desirable characteristics of a wheel having an inflatable tire mounted on the exterior of its rim, but which is not liable to receive punctures.

My invention is particularly adapted for use on automobiles or bicycles.

The novel features of my invention are hereinafter fully described and claimed.

In the accompanying drawings illustrating my invention—Figure 1 is a side elevation, partly broken away, of the preferred form of my invention. Fig. 2 is a vertical sectional view on the dotted line *a—b* of Fig. 1. Fig. 3 is an enlarged, inside view of a portion of the rim shown in Figs. 1 and 2. Fig. 4 is an enlarged cross section of a portion of the wheel taken on the dotted line *a—b* of Fig. 1. Fig. 5 is a side elevation of the hub shown in Figs. 1 and 2. Fig. 6 is a side elevation, partly broken away, of a modified form of my invention. Fig. 7 is a vertical section on the dotted line *c—d* of Fig. 6. Fig. 8 is a reduced side elevation of the rim shown in Figs. 6 and 7. Fig. 9 is an end view of the hub shown in Figs. 6 and 7.

Similar reference characters denote similar parts.

Referring to Figs. 1 to 5, 1 denotes a hub having a circular peripheral flange 2 and a hexagonal portion 3. A support for the hub comprises preferably the following described parts. 4 and 5 denote two members of the support comprising preferably two vertical plates, disposed transversely to the axis of the hub 1 and which support said hub. The plate 4 is provided with a central hole in which is fitted the hexagonal portion 3 of the hub, said plate 4 being rigidly secured by means of rivets 6, which extend through the flange 2 and through a collar 7 mounted on the hub 1 at the inner side of the plate 4. The plate 5 is provided with a central hole, in which is fitted a sleeve 8, which is fitted to and slidably mounted upon the hexagonal portion of the hub, said sleeve being movable parallel with the axis of the hub toward and from the plate 4. The plate 5 is secured by means of rivets 9 to a circular flange 10, provided on the periphery of the sleeve 8. Resilient means are provided for resisting relative movement toward each other of the plates 5 and 4. Said resilient means consist preferably of an annular inflatable tube 11, which encircles the hub 1 and is located between and bears against the plates 4 and 5. The tube 11 is provided with the usual valved air inlet 12, through which air is forced into the tube for the purpose of inflating it. 13 denotes the circular body of a rim, said body being preferably of metal. The rim is provided with an inwardly extending, annular portion 15, which, as shown in Fig. 3, is preferably of zigzag shape and which is provided at its outer edge with two sets of laterally extending ears 14 and 14', which are secured by rivets 16 to the inner side of the body 13 of the rim. For supporting the hub support from the rim, I provide horizontal rods 17, having one set of ends extending through and pivotally mounted in holes 18, said set of ends having respectively secured thereto washers 19, the inner sides of which, as shown in Fig. 4, are rounded and pivotally mounted in recesses 20, provided therefor in the annular portion 15. Alternate rods 17 extend respectively through the plates 4 and 5 and are pivotally mounted in holes 21, provided in said plates, as shown in Fig. 4. The outer set of ends of the rods 17 are provided with heads 22, the inner sides of which are rounded and pivotally mounted in recesses 23, provided in both plates 4 and 5, as indicated in Fig. 4 in the plate 4. In operating this form of my invention, the tube 11 is inflated in the usual manner, thus moving the plate 5 away from the plate 4, until such movement is limited by the rod 17. A load carried by the hub 1 will tend to force the plates 4 and 5 downwardly, which movement will be resisted by the rods 17, which, being supported by the annular portion 15, will tend to draw the plates 4 and 5 toward each other, such movement, however, being resisted by the resilient inflatable tube 11. The tube 11 thus serves, through the intermediacy of the plates 4 and 5, sleeve 8, rods 17, and annular portion 15 of the rim, as a resilient support for the hub 1. By reason of its location, however, the tube 11 is not liable to puncture.

In the form of my invention shown in Figs. 6 to 9, the hub 24, which is preferably hexagonal in form, is provided at its middle with a circular peripheral flange 25. Two parallel transverse plates, 26 and 27, are slidably mounted on the hub 24 at opposite sides of the flange 25, said plates being fitted to the hexagonal periphery of said hub so as not to rotate thereon. Secured to the flange 25 at opposite sides thereof, by rivets 28, are two circular plates 29 and 30. 31 denotes a circular rim, preferably metallic, which is provided on its inner periphery with an annular flange 32, which extends between the plates 29 and 30, between which plates the flange is rotatable around the axis of the hub 24. For supporting the plates 26 and 27 from the flange 32, I provide horizontal rods 33, the inner ends of which are provided with rounded heads 34, pivotally mounted in corresponding recesses provided in opposite sides of the flange 32, through which the rods 33 extend. Alternate rods 33 extend respectively through the plates 26 and 27. The outer ends of the rods 33 are provided with heads 35, having rounded inner sides pivotally fitted in recesses provided therefor in the outer sides of the plates 26 and 27, through which the rods 33 extend. The holes in the flange 32, through which the rods 33 extend, are denoted by 36 and are shown in Fig. 8. The recesses in said flange are denoted by 37, as shown in said figure. Two annular, inflatable tubes, 38 and 39, encircle the hub 24 and are respectively located between the plates 26 and 29 and 27 and 30. The tube 39 is provided with the usual valved inlet 40, through which the tube 39 is filled with compressed air. A tube 41, extends through suitable openings 42, provided in the flange 25 and plates 29 and 30. The ends of the tube 41 are respectively secured to the inflatable tubes 38 and 39, whereby compressed air in said inflatable tubes may pass from one to the other. In the operation of this form of my invention, the tubes 39 and 38 are inflated in the usual manner, through the valved inlet 40, thereby forcing the plates 26 and 27 apart from each other until their movement is resisted by the rods 33. A load carried by the hub 24, will tend to move the plates 26 and 27 downwardly, which movement will be resisted by the rods 33, which are pivotally suspended from the flange 32, and said rods will tend to draw the plates 26 and 27 toward each other, which movement will be resisted by the inflated tubes 38 and 39. These inflated tubes will thus serve as cushions for supporting the hub 24.

I do not limit my invention to the structures shown and described, as many modifications, within the scope of the appended claim, may be made without departing from the spirit of my invention.

Having thus described my invention, what I claim and desire to secure by Letters Patent is:—

In a vehicle wheel, a hub, a rim having an inwardly extending, annular portion, a support for the hub having two plates disposed at opposite sides of said inwardly extending annular portion and supporting the hub and movable relative to each other in a direction parallel with the axis of the hub, said support having an inflatable, annular tube encircling the hub and disposed between said plates and resisting relative movement of the plates toward each other, and rods disposed parallel with the axis of the hub and having one set of ends supported by said inwardly extending, annular portion of the rim, the other set of ends being secured respectively to and supporting said plates and limiting their relative movement away from each other.

In testimony whereof I have signed my name to this specification in presence of two subscribing witnesses.

ALPHA Y. DAVIS.

Witnesses:
E. B. HOUSE,
FLORENCE M. VENDIG.

Copies of this patent may be obtained for five cents each, by addressing the "Commissioner of Patents, Washington, D. C."